(12) United States Patent
Moore et al.

(10) Patent No.: US 8,175,965 B2
(45) Date of Patent: May 8, 2012

(54) SYSTEM AND METHOD FOR PROVIDING PREPAID SERVICES VIA AN INTERNET PROTOCOL NETWORK SYSTEM

(75) Inventors: Richard G. Moore, Cedar Rapids, IA (US); David K. Vognsen, Cedar Rapids, IA (US); Anna M. Appleby, Cedar Rapids, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 3984 days.

(21) Appl. No.: 09/873,001

(22) Filed: Jun. 1, 2001

(65) Prior Publication Data

US 2002/0046255 A1    Apr. 18, 2002

Related U.S. Application Data

(60) Provisional application No. 60/208,537, filed on Jun. 1, 2000.

(51) Int. Cl.
G06Q 40/00    (2006.01)

(52) U.S. Cl. ........................... 705/39; 379/114.2

(58) Field of Classification Search .................. 705/40, 705/35, 39, 36 R, 26.1, 77, 1.1; 379/114.2, 379/114.16; 235/379, 380, 381
See application file for complete search history.

(56) References Cited

U.S. PATENT DOCUMENTS

| | | | | |
|---|---|---|---|---|
| 5,749,075 | A | * | 5/1998 | Toader et al. .................... 705/14 |
| 5,828,740 | A | | 10/1998 | Khuc et al. |
| 5,915,093 | A | | 6/1999 | Berlin et al. |
| 5,963,625 | A | | 10/1999 | Kawecki et al. |
| 5,969,318 | A | * | 10/1999 | Mackenthun ................. 235/380 |
| 5,991,380 | A | | 11/1999 | Bruno et al. |
| 6,226,364 | B1 | * | 5/2001 | O'Neil ........................ 379/114.2 |
| 6,581,827 | B2 | * | 6/2003 | Welton ............................. 235/380 |
| 6,793,135 | B1 | * | 9/2004 | Ryoo ............................. 235/383 |
| 7,222,097 | B2 | * | 5/2007 | Bellosguardo .................. 705/38 |
| 2001/0047386 | A1 | * | 11/2001 | Domenikos et al. .......... 709/203 |
| 2002/0091572 | A1 | * | 7/2002 | Anderson et al. ............... 705/16 |
| 2002/0161676 | A1 | * | 10/2002 | Vadlamani ...................... 705/30 |
| 2005/0147225 | A1 | * | 7/2005 | Mallick et al. ............. 379/114.2 |

FOREIGN PATENT DOCUMENTS

| | | |
|---|---|---|
| EP | 0 902 580 | 3/1999 |
| EP | 0902580 | 1/2008 |
| WO | 97/04579 | 2/1997 |
| WO | 98/47112 | 10/1998 |
| WO | 98/54679 | 12/1998 |
| WO | 99/25106 | 5/1999 |

* cited by examiner

*Primary Examiner* — Kelly Campen

(57) ABSTRACT

A system and method are disclosed for providing prepaid services via an open network architecture system having access to a network, such as the Internet via an Internet protocol. The architecture system is operated by a system operator and includes a customer profile database which stores various customer-related information, such as customer names and their respective payment and contact information, a plurality of databases each storing prepaid accounts for a particular prepaid service, such as telephony, Internet access, paging, and cellular, and web-site system hardware connected to the customer profile database and the plurality of databases and to a network, such as the Internet, for ubiquitously accessing the databases via the Internet for viewing and managing one's prepaid services, as well as purchasing additional prepaid services and/or usage rights. The architecture system further includes network hardware connected to the web-site system hardware for enabling outside system operators, e.g., wholesalers, online retailers, system developers and ISPs, to utilize the architecture system to brand their own prepaid services and offer them through the architecture system.

20 Claims, 3 Drawing Sheets

SYSTEM AND METHOD FOR PROVIDING PREPAID SERVICES VIA AN INTERNET PROTOCOL NETWORK SYSTEM

PRIORITY

This application claims priority to a United States provisional application filed on Jun. 1, 2000 having U.S. Provisional Application Ser. No. 60/208,537, the contents of which are incorporated herein by reference.

BACKGROUND OF THE INVENTION

1. Field of the Invention

The present invention relates generally to network systems, and more specifically is directed toward a system and method for providing prepaid services and products via an Internet protocol (IP) network system and for allowing subscribers to review and manage their prepaid service accounts online and in real-time.

2. Description of the Related Art

Prepaid services, especially prepaid communications services, such as 15 prepaid calling cards, paging, cellular, and Internet access, are becoming very popular in the consumer market. For example, prepaid calling cards are typically used by PSTN subscribers to place calls. Typically, a user or subscriber of a prepaid calling card initiates a phone call by calling a signaling agent, such as a communications station or server, via a toll-free number (800/888) provided on the prepaid calling card. The subscriber is then prompted to enter his home telephone number and an identification number (PIN) also provided on the prepaid calling card using a telephone keypad.

The signaling agent then proceeds to perform validation procedures to determine if the home telephone number matches the identification number using a lookup table stored within a database or if the identification number is valid. If the two numbers match or if the identification number is valid, then the signaling agent performs database queries to determine if the subscriber's account balance is more than a predetermined amount. If the account balance is more than the predetermined amount, then the signaling agent informs the subscriber of the length of calling time available and indicates to the subscriber to enter a number to be dialed. The signaling agent then proceeds to place the call by transmitting signaling messages to appropriate communications devices along a media path flow, i.e., the path through which call media streams are routed through the PSTN. If the account balance is less than the predetermined amount, then the signaling agent informs the subscriber that a call cannot be placed.

During the duration of the call, the signaling agent monitors the subscriber's account balance. If the account balance falls below the predetermined amount, the signaling agent transmits a message to the subscriber via the same media path flow as the path of the call media streams indicating to the subscriber the amount of available time. After the subscriber's account balance has been depleted, the signaling agent tears down the PSTN call by blocking the media path flow as described below.

In the PSTN, the call is torn down by the signaling agent transmitting a "switch-off" signaling message to a media agent or a routing station along the media path flow through which the call media streams are routed through. The "switch-off" signaling message disables the media agent to prevent the call media streams from being transmitted further along the media path flow. Hence, the PSTN call is torn down.

It is inconsequential if the signaling agent is or is not located along the media path flow, since in the PSTN, signals transmitted to or received from any one station (e.g., a server) can be directed to or received from a variety of other stations or servers within the network. Therefore, in a prepaid calling card scenario, whether or not the signaling agent is located along the media path flow, the signaling agent can effectively control call setup, the duration of the call based on the subscriber's account balance, and call tear down by directing signaling messages to the appropriate media agent or other routing station.

One method by which the subscriber can replenish the calling card is by accessing the signaling agent's web site and purchasing additional time by entering payment information, such as credit card information, identifying information, such as the calling card number, and the amount of calling time desired. The signaling agent then uses the entered information to sell additional calling time to the subscriber. The subscriber performs similar steps for purchasing other prepaid services, such as paging, cellular, and Internet access. That is, the subscriber typically accesses a plurality of web sites associated with a plurality of service providers to purchase additional time and/or units, e.g., paging time, cellular calling time, and Internet access time, or the subscriber calls each of the plurality of service providers to purchase the prepaid services.

The prior art systems and methods require the subscriber to contact each service provider to purchase additional prepaid services. That is, the prior art systems and methods do not bundle a host of prepaid services which can reduce delivery costs and which allows the subscriber to interact with only one service provider for all kinds of prepaid services. As such, typically, the subscriber needs to contact a different representative of the same service provider for each type of prepaid service, if the subscriber needs to purchase additional prepaid services for two or more services from the same service provider. Further, the prior art systems and methods for purchasing prepaid services do not offer the subscribers the capability to review and manage their prepaid services online and in real-time. The subscriber is typically notified of the amount of prepaid time and/or units available before initiating the prepaid service and just before the purchased time and/or units is almost depleted while using the prepaid service.

Further still, prior art systems and methods for providing prepaid services typically do not incorporate credit card processing and fraud screening of transactions. Additionally, the prior art systems for implementing prepaid services typically have a closed network architecture system, and hence the network architecture system cannot be used by potential customers of the service providers, such as wholesalers, online retailers, system developers and Internet service providers (ISPs), to brand their own prepaid services and offer these prepaid services to their customers.

Accordingly, a need exists for a system and method for providing prepaid services via an Internet protocol (IP) network system which overcomes the drawbacks of the prior art systems and methods. Hence, a need exists for a system and method for allowing subscribers of prepaid Internet services to review and manage their prepaid service accounts online and in real-time. Further, a need exists for a system and method for bundling a host of prepaid services to reduce delivery costs and allow the subscriber to interact with only one service provider for all kinds of prepaid services.

Further still, a need exists for a system and method for providing prepaid services which incorporate credit card processing and fraud screening of transactions. Additionally, a need exists for a system and method for implementing prepaid services using an open network architecture system, where customers of the service providers, such as wholesalers, online retailers, system developers and Internet service providers (ISPs), can use the open network architecture system to brand their own prepaid services and offer these prepaid services to their customers.

SUMMARY OF THE INVENTION

The present invention provides a system and method for providing prepaid services via an Internet protocol (IP) network system which overcome the drawbacks of the prior art systems and methods. The system and method of the present invention offer several advantages over the prior art systems and methods. Several of these advantages include: (1) the ability to allow subscribers of prepaid Internet services to review and manage their prepaid service accounts online and in real-time from anywhere (i.e., ubiquitous access); (2) the capability of bundling a host of prepaid services to reduce delivery costs and allow the subscriber to interact with only one service provider for all kinds of prepaid services; (3) the incorporation of credit card processing and fraud screening of transactions; and (4) the implementation of prepaid services using an open network architecture system, where customers of the service providers, such as wholesalers, online retailers, system developers and Internet service providers (ISPs), can use the open network architecture system to brand their own prepaid services and offer these prepaid services to their customers. Other advantages of the present invention will become apparent from the foregoing detailed description section.

The system of the present invention includes an open network architecture system operated by a system operator. The open network architecture system includes a customer profile database which stores various customer-related information, such as customer names and their respective payment and contact information; a plurality of databases each storing prepaid accounts for a particular prepaid service, such as telephony, Internet access, paging, cellular, hosting and other telecommunications services; and web-site system hardware having a server connected to the customer profile database and the plurality of databases and to a network, such as the Internet, for providing customers with ubiquitous access to the databases for viewing and managing prepaid online accounts, as well as purchasing additional prepaid services and/or usage rights thereof. The web-site system hardware maintains a web-site having a corresponding URL for enabling the customers to interface with the system 100 to view and manage their prepaid online accounts, as well as to purchase additional prepaid services.

The open network architecture system further includes network hardware, such as a server and gateway connected to the web-site system hardware for enabling outside system operators, e.g., wholesalers, online retailers, system developers and ISPs, to utilize the web-site system hardware to brand their own prepaid services and offer them through the open network architecture system. For example, the network hardware can include a remote server set up and operated by the outside system operators. The remote server in turn is connected to the network hardware for interfacing with the web-site system hardware. Accordingly, a customer of the outside system operators can connect to a web-site having a URL corresponding to the server of the web-site system hardware via the remote server. While viewing the web-site, the customer can purchase prepaid services offered by the outside system operators, and/or manage and view his online account.

Hence, from a business perspective, the outside system operators are customers of the system operator and as such, the outside system operators pay the system operator a predetermined usage fee for using the open network architecture system to offer prepaid services. The customer profiles and prepaid online accounts of the customers of the outside system operators are stored within databases of the open network architecture system. The fact that the outside system operators are using the architecture system of the system operator to provide their own prepaid services is transparent to their customers.

BRIEF DESCRIPTION OF THE DRAWINGS

Various preferred embodiments are described herein with references to the drawings.

DETAILED DESCRIPTION OF PREFERRED EMBODIMENTS

The present invention is described in the context of the world wide web. However, the present invention may find application in any networked environment where one or more databases are accessible to a remote user via a server. In such environments, a prepaid service provider having access to at least one database can provide a user with a host of prepaid services, i.e., bundling of a plurality of prepaid services, via a web interface, such as a web-site which is accessible from anywhere, i.e., ubiquitous access. The prepaid service provider can also allow its own customers, such as wholesalers, online retailers, system developers and ISPs, to brand their own prepaid service products and offer them to customers through their own web-site or portal. This is possible since the system of the present invention includes an open network architecture system as described below.

Another advantage of the present invention includes the ability to allow subscribers of prepaid Internet services to review and manage their prepaid service accounts online and in real-time from anywhere (i.e., ubiquitous access). For example, a customer can access the system via the web-site and order a prepaid personal identification number (PIN) online and receive the PIN or other unique identifier in real-time electronically. The customer can return to the web-site to replenish and view his prepaid service account in real-time.

As another example, the customer can order a prepaid pager package, prepaid cellular package, and prepaid Internet access online and in real-time via the same web-site, and replenish the pager unit, add cellular air time, and purchase additional Internet access online at the same web-site or an associated web-site. Another advantage of the present invention is the incorporation of credit card processing and fraud screening of transactions.

Figure 1:
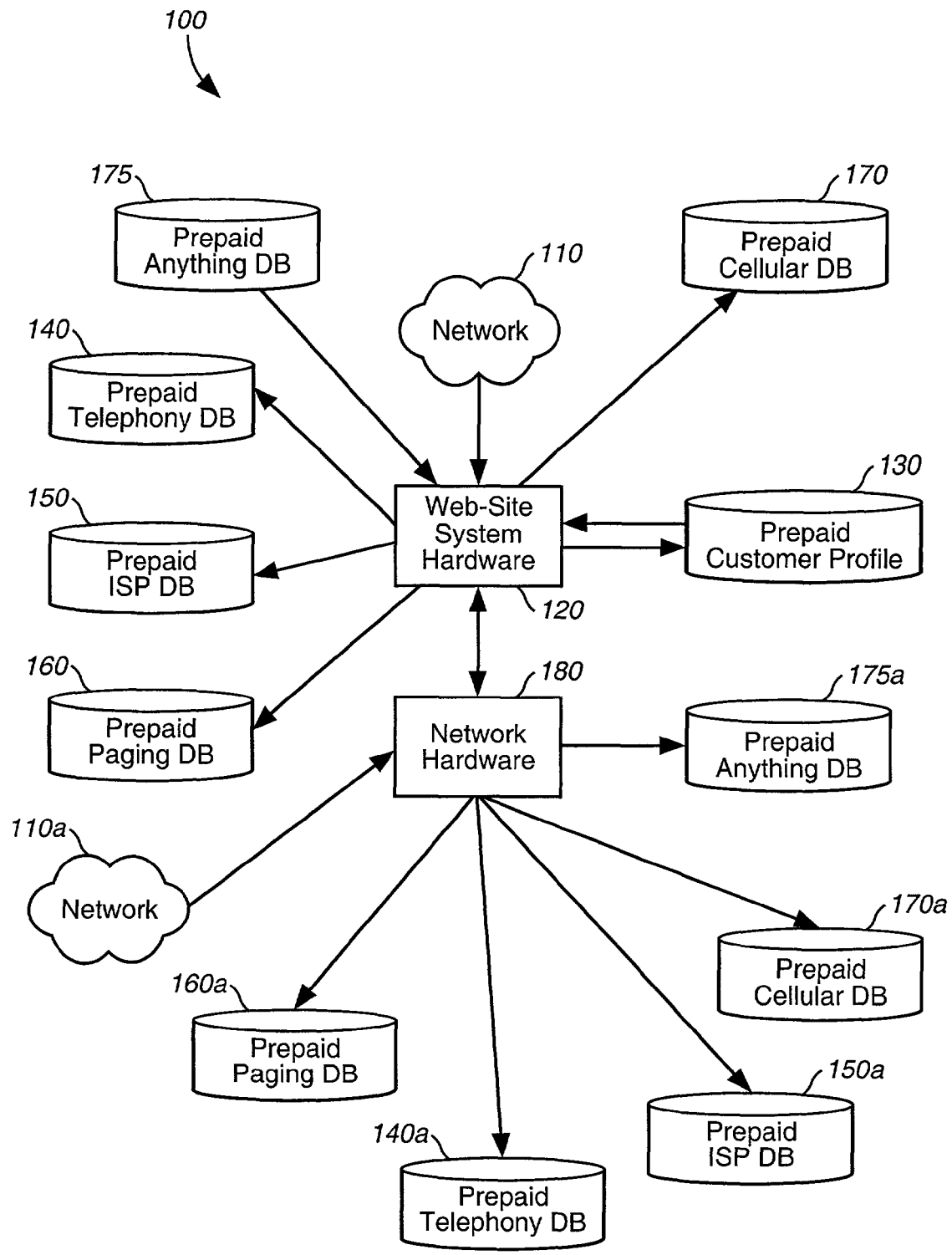
FIG. 1 is a block diagram of an open network architecture system in accordance with the present invention.

FIG. 1 illustrates an exemplary open network architecture system according to the present invention designated generally by reference numeral 100. The open network architecture system 100 is accessible via a network connection through the network 110, such as the Internet, for allowing a plurality of customers, such as individual end-users having a web browser, to ubiquitously access the system 100 for purchasing prepaid services and/or usage rights thereof, and managing and viewing their prepaid online accounts, etc. in real-time.

The system 100 is interfaced to the network 110 by network hardware as known in the art, such as servers, routers, gateways, etc. The system 100 is associated with one or more web-sites having corresponding URLs for enabling the plurality of customers to interface with the system 100 via the network 110.

Each of the web-sites is maintained by web-site system hardware 120, such as a server, or other suitable computing hardware, as known in the art. The web-site system hardware 120 is configured and customized by various software modules for enabling the system 100 to perform the various functions and for maintaining each of the web-sites. For example, the software modules include communications software of the type conventionally used for Internet communications and database management software for managing a plurality of databases connected to the web-site system hardware 120. Any number of commercially available database management software packages or customized database management software may be utilized to implement the invention.

The plurality of databases include a prepaid customer profile database 130 storing various customer-related information, such as customer names and their respective payment and contact information; and a host of additional databases each storing prepaid accounts for a particular prepaid service, such as a database for storing prepaid accounts for telephony 140; a database for storing prepaid accounts for Internet access 150; a database for storing prepaid accounts for paging 160; and a database for storing prepaid accounts for cellular 170.

During operation, once a connection between a end-user computer (not shown) and the web-site system hardware 120 is established via the Internet 110, the server of the web-site system hardware 120 transmits to the end-user computer an HTML document representing a web page, preferably, the home page, of one of the web-sites associated with the server, where the web page transmitted is a web page of a web-site corresponding to a user-entered URL.

Figure 2:
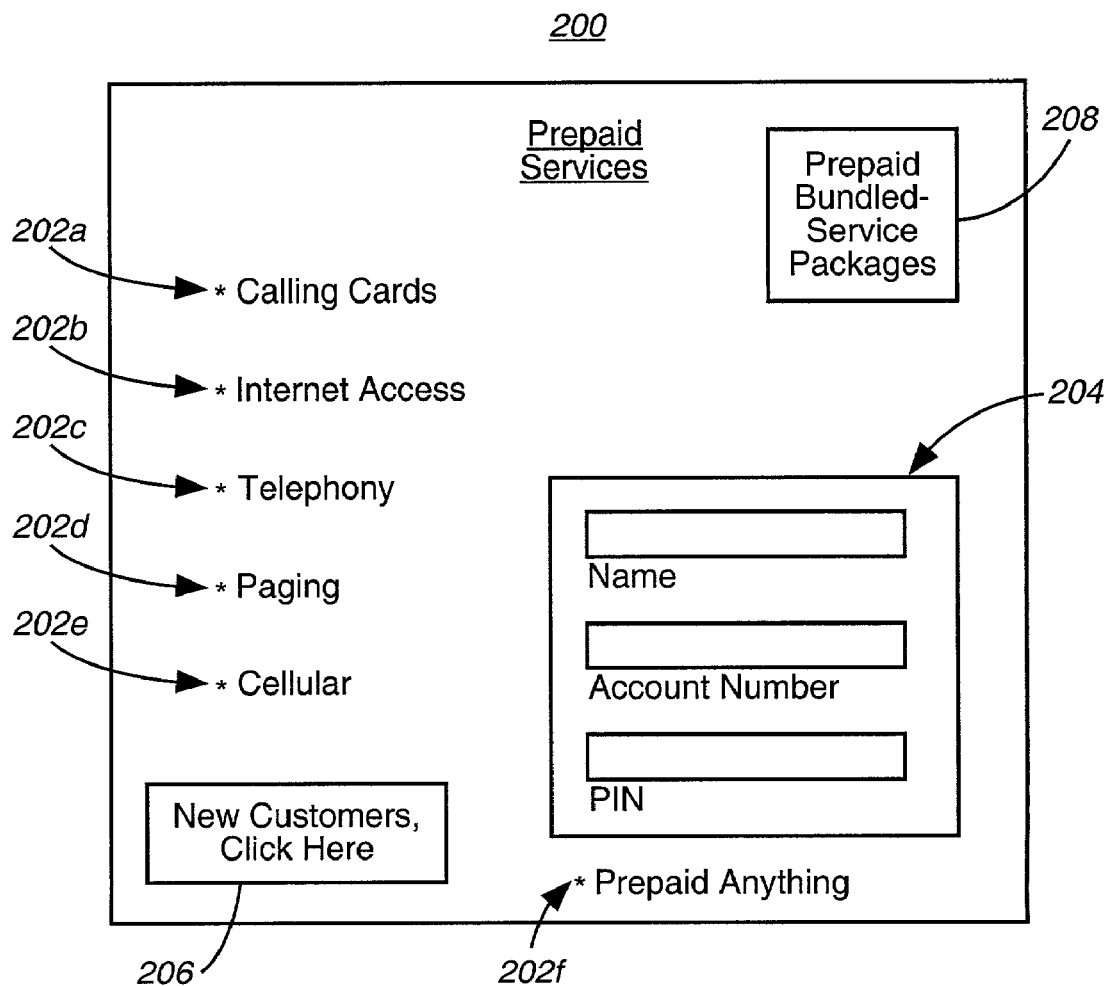
FIG. 2 is an exemplary home page of a web-site associated with the open network architecture system of FIG. 1.

FIG. 2 illustrates an exemplary home page 200 associated with the server. The home page 200 includes icons 202a-e for selecting one of the following types of prepaid services: calling cards, Internet access, telephony, paging and cellular. The home page 200 further includes an icon 202f marked as "Prepaid Anything" for selecting other types of prepaid services and products, such as other telecommunications services, prepaid cable television, prepaid Internet hosting services, such as prepaid web-site hosting, prepaid utilities, prepaid travel and entertainment tickets, prepaid gasoline, prepaid heating oil or other metered services, etc. A corresponding database(s) 175 is provided which is managed by the web-site system hardware 120 and which stores usage and other customer information of Prepaid Anything services and products in the same manner as databases 140, 150, 160, 170.

The home page 200 further includes field 204 for entering identifying information, such as customer name, online account number, PIN, etc., and icon 206 for registering new customers. An icon 208 is also included at the home page 200 and preferably through the web-site for enabling customers to purchase prepaid bundled-service packages, i.e., one-stop prepaid shopping packages having a host of prepaid services, if the icon 208 is clicked. It is contemplated that the system operator offers such prepaid bundled-service packages at a discount as compared to selling the prepaid services contained within the prepaid bundled-service packages individually.

If icon 206 is clicked, a web page of the web-site is accessed for registering a new customer. After the new customer has registered, the entered information which preferably includes the customer's identifying and payment information, is transmitted to the server of the web-site system hardware 120 and subsequently stored in the prepaid customer profile database 130. Also, after the new customer has registered, a PIN is determined by the system 100 and transmitted to the new customer in real-time. An account number is also preferably determined and transmitted to the new customer in real-time.

After entering the identifying information in fields 204 of the exemplary home page 200 and clicking one of the icons 202a-f, a web page of the web-site is accessed based on the type of prepaid service selected via icons 202a-f. The web page accessed includes data retrieved by the web-site system hardware 120 from one of the prepaid databases 140, 150, 160, 170, 175 and indicates the customer's online account for the selected prepaid service. The web page accessed also offers the customer the opportunity to purchase a new prepaid package or additional prepaid usage time and/or units for the selected prepaid service. Units refers to any other allocation of prepayment, such as, for example, tokens of metered usage rights, or a currency which has buying power for some service.

Figure 3:
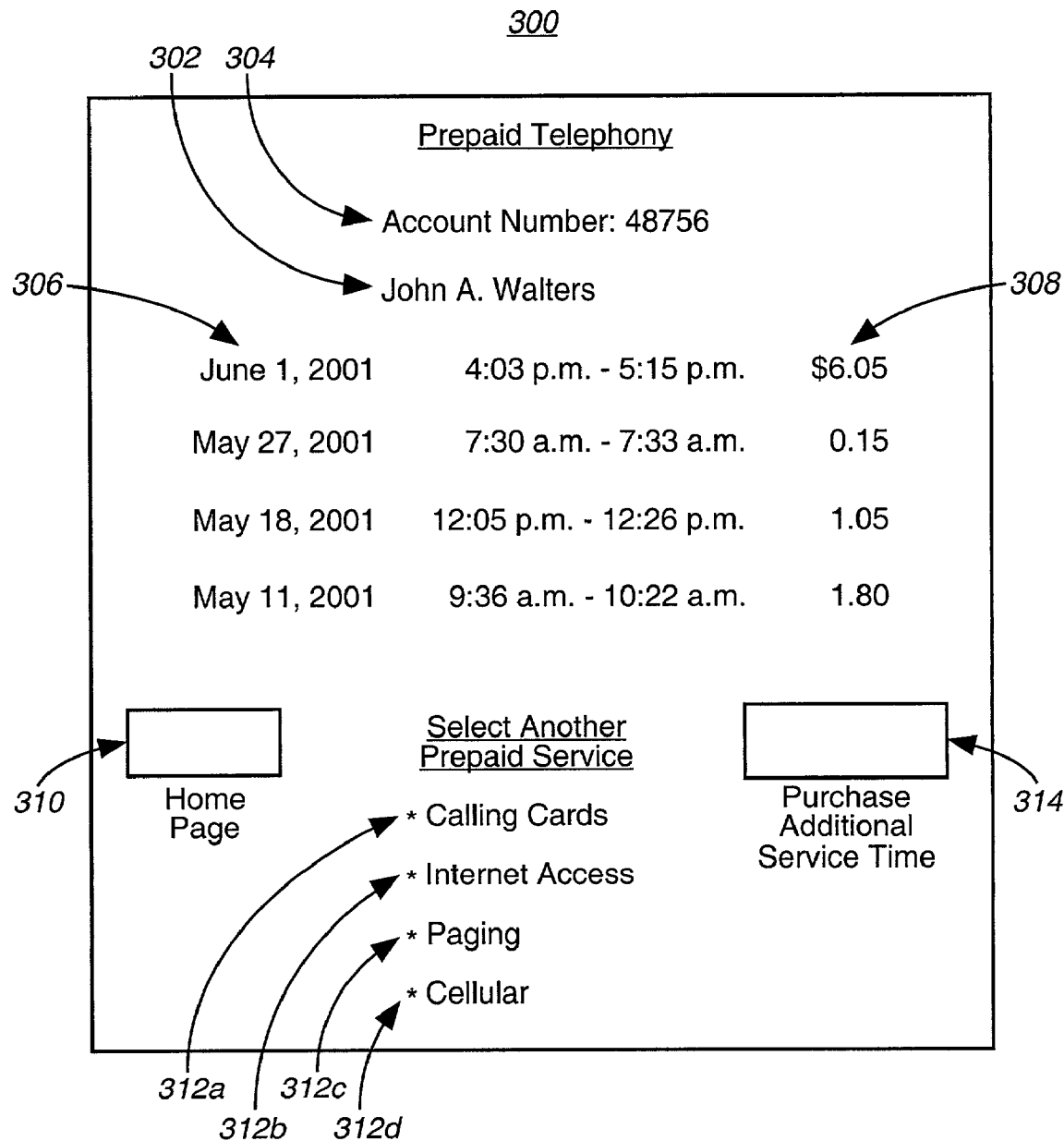
FIG. 3 is an exemplary web page of the web-site associated with the open network architecture system of FIG. 1.

An exemplary web page of the prepaid telephony service is illustrated by FIG. 3 designated generally by reference numeral 300. The web page 300 includes the customer's name 302 and account number 304. Also included in the web page 300 is a field 306 indicating the dates and times the customer used the prepaid telephony service. The data for field 306 is obtained from the prepaid telephony database 140 by the web1 site system hardware 120 and displayed to the customer via the web page 300. A field 308 is also provided indicating the corresponding charges. The data for field 308 is preferably also obtained from the prepaid telephony database 140 by the web-site system hardware 120 and displayed to the customer via the web page 300.

It is contemplated that other type of information can be displayed by the web pages 300, such as the total number minutes for each call and the per minute charges. This other type of information is preferably also stored in the corresponding databases 140, 150, 160, 170, 175 for retrieval by the web-site system hardware 120.

The web page 300 further includes an icon 310 for returning to the home page 200 and icons 312a-d for selecting another prepaid service. Also included is an icon 314 for purchasing additional prepaid telephony services and/or usage rights. If icon 314 is clicked, then another web page associated with the web-site is accessed for entering how much service time and/or units the customer wants to purchase and payment information, such as credit card information, if the payment information is not stored within the prepaid customer profile database 130 for the particular customer.

It is contemplated that the payment information for each customer is stored in the prepaid customer profile database 130 and retrieved after the customer authorizes the purchase of additional service time and/or units, or the purchase of a prepaid package, e.g., a prepaid cellular package. Accordingly, the customer does not have to enter his payment information every time he purchases additional prepaid service time and/or units, prepaid packages, etc. via the web-site operated by the web-site system hardware 120.

Nonetheless, if the payment information is retrieved from the prepaid customer profile database 130 or entered by the customer, the payment information is preferably verified by the system 100 prior to completing the payment transaction. The verification process in the case of credit card transactions entails for the system 100 to link via the network 110 to a database of "hot" credit card numbers for fraud screening of credit card transactions. Accordingly, software modules within the web-site system hardware 120 transmit credit card payment information through a gateway to a credit card transaction processing system. The processing system upon verifying the credit card payment information transmits back to the web-site system hardware 120 a message indicating whether to proceed with the credit card transaction or not to proceed.

If the processing system indicates to the web-site system hardware 120 to proceed with the credit card transaction, then the system 100 processes the credit card transaction. After processing the credit card transaction, the system 100 appends a database of transactions with the transactional information, i.e., the customer's name, account number, amount paid, type of prepaid services purchased, etc. It is contemplated that the system 100 appends the database of transactions regardless of whether the transaction is a credit card transaction or some other type of transaction, such as charging a bank account or other account. The database of transactions can be accessed by the customers to access their historical transactional information for the different types of prepaid services.

A similar web page as the web page 300 is provided for each of the prepaid services offered by the system operator of the system 100. It is noted that if the calling card icon 202a is selected by the customer while viewing the home page 200, the only option offered to the customer via a web page associated with the prepaid calling card service is the option to purchase additional time and/or units, or a calling card package. The system 100 does not provide the customer with a detailed listing of the dates and times of when the customer used his calling card. Hence, there is no database provided for the calling card prepaid service offered by the system 100, since the system 100 does not store calling card usage data.

With reference to FIG. 1, the open network architecture system 100 further includes network hardware 180 having, e.g., a server and a gateway, connected to the web-site system hardware 120 via a dedicated link for enabling outside system operators, e.g., wholesalers, online retailers, system developers and ISPs, to utilize the web-site system hardware 120 to brand their own prepaid services, including prepaid bundled-service packages, and offer them through their own web-site (or a web page thereof), e.g., a banner on their web-site, hyperlinked to or operated by the server of the web-site system hardware 120 of the open network architecture system 100.

For example, the outside system operators as part of the network hardware 180 can have set up a remote server connected to a gateway. Accordingly, a customer of the outside system operators can connect via a network connection to the network 110a for connecting to the web-site system hardware 120 via the remote server and gateway, and interface with the web-site system hardware 120 via a web-site associated with the website system hardware 120 and personalized for the outside system operator(s).

While having access to the web-site system hardware 120, the customer can purchase prepaid services offered by the outside system operators, and manage and view their online accounts stored within the various databases and provided to the customers via the web-site in a similar manner as discussed above with reference to FIGS. 2 and 3.

It is provided that the outside system operators could be businesses not interested in signing long-term contracts for these type of services, as well as businesses who are uncertain of their usage patterns for these type of services. Further, the outside system operators could be businesses who enter into a business relationship with the system operator to offer prepaid services as a promotional tool to their customers and/or prospective customers by hyperlinking their web-site to the web-site system hardware 120. For example, a business could bundle two types of prepaid services, such as free prepaid Internet access with the purchase of prepaid cellular, and offer the two type of prepaid services via its web-site, which is hyperlinked to the web-site system hardware 120, to their customers and/or prospective customers accessing the business's web-site or e-mail distribution system.

It is contemplated that the web-site is a company intranet web-site, the network 110a is a LAN or WAN, and the outside system operator is a company providing prepaid services to its employees, especially telecommuting or traveling employees. Hence, the company can control the amount of prepaid services being used by its employees. Further, the employees can access the intranet web-site via the network hardware 180 and the web-site system hardware 120 of the system 100 for managing and viewing their online accounts and for requesting their company to purchase additional prepaid services for them from the system operator or authorizing their company to allow them to purchase additional prepaid services themselves from the system operator.

Hence, from a business perspective, the outside system operators are customers of the system operator of the system 100 and as such, the outside system operators pay the system operator a predetermined usage fee for using the open network architecture system 100 to offer prepaid services. The customer profiles and prepaid online accounts of the customers of the outside system operators are stored within databases 130, 140a, 150a, 160a, 170a, 175a of the open network architecture system 100. The databases 140a, 150a, 160a, 170a, 175a are similar to the databases 140, 150, 160, 170, 175. The fact that the outside system operators are using the open network architecture system 100 of the system operator to provide their own prepaid services is transparent to their customers.

It is contemplated that a separate customer profile database can be provided similar to database 130 for storing customer information corresponding to customers of the outside system operators. It is further contemplated that all the databases of the open network architecture system 100 can be combined into one database.

It can be appreciated that the system 100 of the present invention coordinates with a prepaid services allocation system for providing the various types of prepaid services described above. For example, after a customer purchases additional telephony usage time and/or units, the system 100 transmits to the prepaid services allocation system the customer's account number and amount of additional telephony usage time and/or units purchased, in order for the allocation system to allocate the amount of telephony usage time and/or units purchased and to track the customer's usage of the prepaid telephony service. When the customer has used all of the purchased usage time and/or units, the allocation system cuts off service to the customer.

The tracked usage time and/or units is transmitted to the system 100 by the allocation system for storage within one of the prepaid telephony databases 140, 140a according to whether the customer is a customer of the system operator or an outside system operator. The tracked usage time and/or units can then be accessed and viewed by the customer as described above with reference to FIG. 3.

It can be further appreciated that the web-site system hardware 120 and the network hardware 180 are provided with a set of software modules having instructions capable of being executed by at least one processor for performing the respective functions of the web-site system hardware 120 and the network hardware 180. The web-site system hardware 120 and the network hardware 180 are preferably provided with one or more application program interfaces (APIs) having a set of routines, protocols and tools for executing software applications. It can be appreciated by one having ordinary skill in the art that APIs, programming tools and documentation are provided to a programmer, e.g., as part of a software development kit (SDK), to enable the programmer to develop the software applications.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A system for accessing prepaid services information, comprising:
   a web portal configured to present information relating to a plurality of prepaid services offered by different prepaid service providers; and
   a database configured to store a plurality of user profiles, each user profile specifying user account information identifying the prepaid services of a plurality of the prepaid service providers, wherein the web portal is further configured to transmit the user account information stored in a user profile to a respective user,
   and to receive from the respective user a selection of one or more of the prepaid services identified in the transmitted user account information.

2. A system according to claim 1, wherein the web portal is configured to support offering any one of the prepaid services to any one of a plurality of users.

3. A system according to claim 1, wherein the web portal is maintained by a system operator having a customer that is one of a plurality of users.

4. A system according to claim 3, wherein another system operator has a customer that is one of the users, the other system operator compensating the system operator for use of the web portal, the other system operator being one of a wholesaler, an online retailer, a system developer, or an Internet Service Provider (ISP).

5. A system according to claim 1, wherein the web portal is configured to provide users with real-time management of accounts for the prepaid services.

6. A system according to claim 1, wherein a plurality of users are each assigned a unique identifier for accessing the web portal.

7. A system according to claim 6, wherein the unique identifier includes a Personal Identification Number (PIN).

8. A system according to claim 1, wherein the information relating to the prepaid services includes payment information.

9. A system according to claim 1, wherein the web portal is further configured to initiate a payment verification process for the prepaid services.

10. A system according to claim 1, wherein the plurality of prepaid services includes one of prepaid calling card, prepaid Internet access, prepaid telephony, prepaid paging, prepaid cellular, prepaid cable television, prepaid travel, entertainment tickets, prepaid utilities, prepaid Internet hosting, prepaid gasoline, or prepaid heating oil.

11. A system according to claim 1, wherein the web portal presents the plurality of prepaid services as a prepaid bundled-service package.

12. A system according to claim 1, wherein a transaction conducted by the respective user via the web portal is verified by fraud detection system.

13. A system according to claim 1, wherein the web portal provides usage information for the prepaid services, and supports purchase of additional units of the prepaid services.

14. A method for supporting management of prepaid services, the method comprising:
   receiving a request, at a web portal, from a user among a plurality of users for information relating to a plurality of prepaid services offered by a plurality of prepaid service providers, the request including a selection of one of the prepaid services input by the user; and
   retrieving a profile for the user, the profile specifying user account information corresponding to one or more of the prepaid services of each of the plurality of prepaid service providers; and
   transmitting the information relating to the prepaid services for presentation to the user according to the profile.

15. A method according to claim 14, wherein the information relating to the prepaid services includes payment information.

16. A method according to claim 14, further comprising initiating a payment verification process for the prepaid services by the web portal.

17. A method according to claim 14, wherein the plurality of prepaid services includes one of prepaid calling card, prepaid Internet access, prepaid telephony, prepaid paging, prepaid cellular, prepaid cable television, prepaid travel, entertainment tickets, prepaid utilities, prepaid Internet hosting, prepaid gasoline, or prepaid heating oil.

18. A method according to claim 14, wherein the web portal presents the plurality of prepaid services as a prepaid bundled-service package.

19. A method according to claim 14, further comprising:
   communicating with a fraud detection system to verify a transaction initiated by the user via the web portal.

20. A method according to claim 14, wherein the web portal provides usage information for the prepaid services, and supports purchase of additional units of the prepaid services.

* * * * *